INVENTOR.
HANS W. MOCKER
BY Charles J. Ungemach
ATTORNEY

United States Patent Office 3,503,005
Patented Mar. 24, 1970

3,503,005
RING LASER WHICH IS BIASED TO PERMIT TWO EQUAL INTENSITY TRANSITION FREQUENCIES TO BE GENERATED IN OPPOSITE DIRECTIONS
Hans W. Mocker, Minneapolis, Minn., assignor to Honeywell Inc., Minneapolis, Minn., a corporation of Delaware
Filed Oct. 17, 1967, Ser. No. 675,847
Int. Cl. H01s *3/00;* G01b *9/02*
U.S. Cl. 331—94.5        4 Claims

ABSTRACT OF THE DISCLOSURE

Apparatus to frequency stabilize a molecular gas ring laser. The laser is biased sufficiently to permit the generation of two different transition frequency beams in opposite directions about the ring laser cavity. Suitable monitors are used to adjust the cavity length so as to keep the beams at equal intensities in which condition the two frequencies remain constant.

BACKGROUND OF THE INVENTION

It is extremely desirable to maintain a ring laser at a particular predetermined frequency for use in experiments where a known frequency of monochromatic light is necessary. In the prior art various schemes have been used to hold the cavity length of a ring laser constant so as to stabilize the frequency of operation. Despite these efforts thermal gradients, mechanical stresses, and numerous other variables affected by the laser operation cause heretofore unavoidable drift in the cavity length and, therefore, the frequency. My invention employs formerly unrecognized discriminate characteristics of the laser beams to identify and maintain a particular frequency of operation. In this way all the variables causing drift are continuously compensated for and the laser cavity may be kept at a constant length.

SUMMARY OF THE INVENTION

Briefly, the present invention comprises a ring laser operating with a molecular gas, for example, carbon dioxide, so that several different transitions belonging to the rotation-vibration band of carbon dioxide are available to lase at different gain conditions. A carbon dioxide gas ring laser will not support, simultaneously, beams in both clockwise and counterclockwise directions from the same atomic transition frequency. However, if the laser is biased by the proper amount the gain in the clockwise direction may be made different from the counterclockwise gain by an amount sufficient to allow generation of laser light from one transition frequency in the clockwise direction and generation in the counterclockwise direction of light from a different atomic transition frequency. It has been found experimentally that by maintaining the intensities of these two counter-rotating beams equal both beams are constrained to operate at predetermined stable frequencies. Consequently, an intensity monitor is used in the preferred embodiment of my invention to compare the intensities of the two counter-rotating beams and adjust the cavity length so as to maintain these intensities equal. Hence, it is an object of my invention to provide an improved molecular gas laser. A further object of my invention is to provide apparatus to frequency stabilize a molecular gas ring laser. Other objects and advantages will become apparent to those skilled in the art upon consideration of the following detailed description and drawing.

DESCRIPTION OF THE PREFERRED EMBODIMENT

Figures 1, 2:
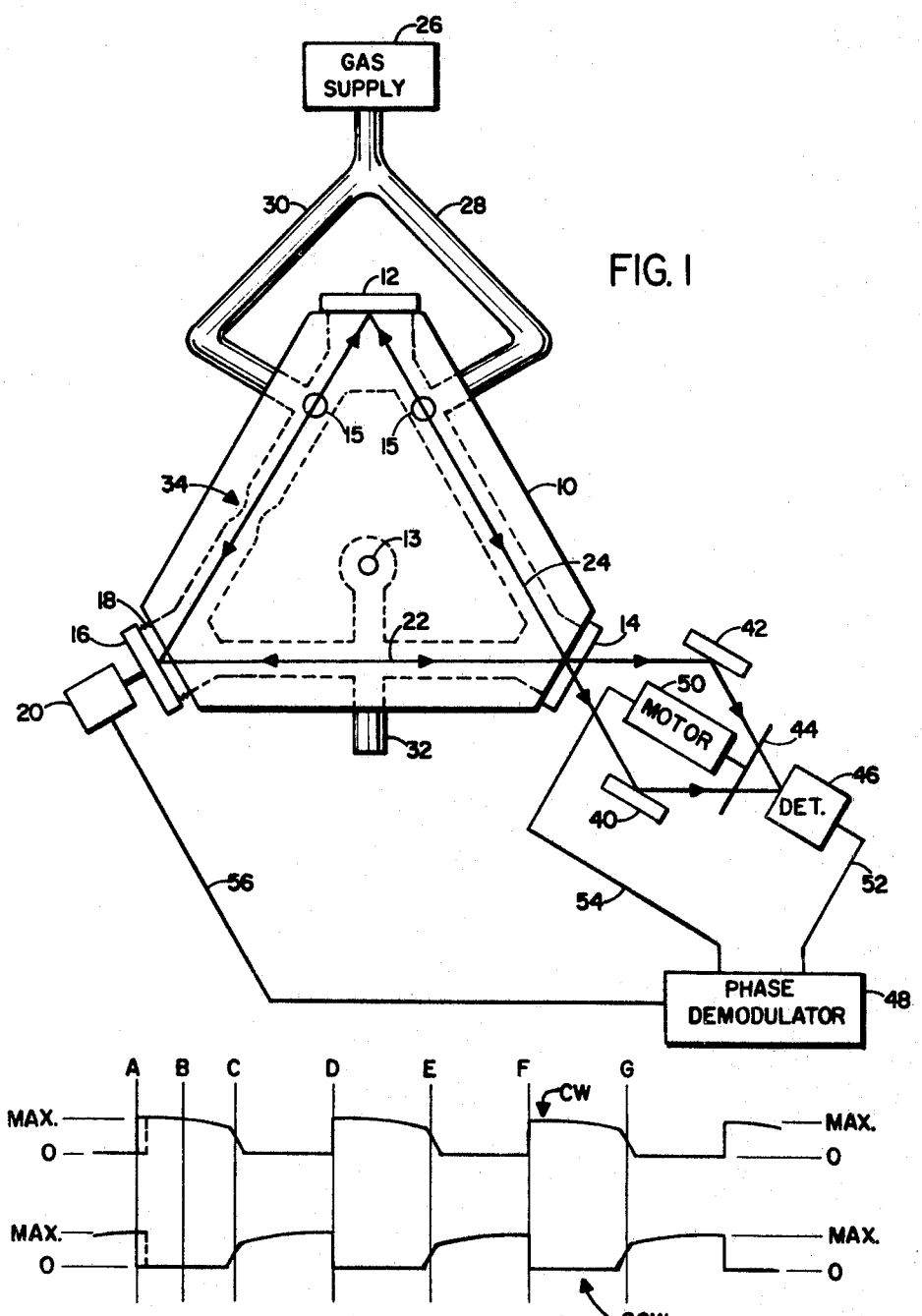
FIGURE 1 is a schematic diagram showing generally the arrangement of major elements in the present invention.
FIGURE 2 is a graph comparing the output intensities of the two counter-rotating beams in the laser.

FIGURE 1 shows a triangular ring laser constructed by tunneling a triangular path in a solid block 10 of a suitable material such as quartz. Three mirrors 12, 14, and 16 are mounted at the corners of the triangle so as to reflect the beam about the ring or cavity. Mirror 16 is mounted to block 10 by means of a flexible member 18 so that mirror 16 may be adjusted by a suitable electromechanical transducer 20. Transducer 20 may be a piezoelectric element or any other device operable to move mirror 16 so as to adjust the total length of the triangular path. A pair of anodes 15 and a cathode 13 communicate with the triangular path to permit electrical discharge in the gas so to power the laser. Mirror 14 is partially reflecting and constructed of a low loss material such as germanium so that counter-rotating beams indicated by arrows 22 and 24 may pass through. In the preferred embodiment the molecular gas employed is carbon dioxide in conjunction with nitrogen and helium. Carbon dioxide must be continually replenished since the laser action tends to decompose the gas over a short period of time. Thus, a gas supply 26 is employed to deliver a mixture of carbon dioxide, nitrogen, and helium gas by means of a pair of tubes 28 and 30. Gas from tube 28 will generally flow down the right side of the triangle and exhaust through a tube 32. Gas from tube 30 will generally flow down the left side of the triangle and also exhaust through tube 32. However, since there is a small constriction on the left side, at point 34, the gas will not flow as quickly on the left side as it does on the right side of the triangle. It has been experimentally found that this unbalanced flow of gas causes the laser to be biased in a fashion such that the gain in the counterclockwise direction is different from the gain in the clockwise direction at all cavity lengths except one. This gain anisotropy is believed to result from the doppler shift experienced by the counter-rotating beams as they propagate either against or with the direction of flow of the gas.

The gain in an unbiased ring laser reaches a maximum at only one frequency. Any bias system which shifts the relative operating frequency of the beams will cause a gain anisotropy. In the preferred embodiment the Doppler shift causes one beam to have its point of maximum gain at a lower frequency than the other beam. Thus, for any single transition frequency, the gain of one beam is higher than the gain of the oppositely traveling beam. The beam with the higher gain will lase to the exclusion of the other beam because the laser tends to operate in the most efficient condition. In other words, only one beam will lase at a time from one transition. This is clearly illustrated in FIGURE 2.

FIGURE 2 compares the intensities of the two oppositely traveling beams as experimentally measured in a flow biased carbon dioxide ring laser, while gradually changing the cavity length. At the far left of FIGURE 2 it can be seen that the counterclockwise beam represented by the lower curve is nearly at maximum intensity, while the clockwise beam represented by the upper curve has a zero intensity or is not lasing. As the cavity is gradually tuned or changed in length (represented in FIGURE 2 by moving to the right) the frequency of the lasing beam is forced to gradually change. At point A the gain of the clockwise beam becomes greater than the gain of the counterclockwise beam and the clockwise beam begins to lase jumping immediately to maximum intensity. The counterclockwise beam diminishes to zero at the exact same instant. As the cavity is tuned further to point B the counterclockwise beam will remain off while the clockwise beam slowly diminishes in intensity as the cavity is tuned away from the frequency at which the clockwise beam has the highest gain. If at this point one reverses the tuning process in the other direction a certain amount of hysteresis is experienced and the two curves follow the dotted lines shown adjacent to point A. Thus, the switch-over point is different depending upon the direction of tuning and point A is not suitable for frequency stabilization.

As the cavity is further tuned to the right at point C the clockwise beam quickly decreases to zero while a counterclockwise beam generated from a new transition begins as shown by the lower curve. This new transition draws on an entirely different supply of atoms than the original first transition. Thus, both beams may operate at the same time since they do not compete for the same supply of atoms. It is at this point that frequency stabilization may be successfully accomplished by maintaining the intensities at precisely the same level. An excursion to the right of C decreases the clockwise intensity while it increases the counterclockwise intensity. An excursion to the left has the opposite effect.

Approximately 15 different transitions were noticed with the apparatus of the present invention and it is known that many more transitions can oscillate. Thus, as the tuning is continued to the right at point D the counterclockwise beam from the second transition ceases and the clockwise beam from the second transition starts. At point E the clockwise beam intensity from the second transition is quickly diminishing while the counterclockwise beam from the third transition is starting to lase. Therefore, the apparatus may be frequency stabilized about the point E and again about the point G and so on until all the transitions available from carbon dioxide have been used up.

The apparatus to equalize the intensity of the two beams is shown in FIGURE 1. Both beams 24 and 22 pass through partially transparent mirror 14. The two beams reflect off a pair of mirrors 40 and 42, through a chopper wheel 44, and then to a detector 46. Chopper 44 is driven by a motor 50 and is configured in such a way as to alternately pass first one beam and then the other onto detector 46. The intensity on detector 46 will be steady if the two beams are of equal intensity. However, if the beams are of unequal intensities the intensity of light impinging on detector 46 will vary so that a signal in the shape of a squarewave will be passed to a phase demodulator 48 by means of a lead 52. A reference signal is derived from motor 50 by means of a lead 54 so that phase demodulator 48 can determine which of the two beams has a higher intensity in accordance with principles well known to those skilled in the art. This information is used to generate a plus or minus signal on lead 56 so that actuator 20 can shorten or lengthen the cavity path so as to bring the beams into an equal intensity condition. As long as the beams are kept equal in intensity the laser will be operating at two discrete predetermined frequencies representing two discrete transitions as discussed with respect to FIGURE 2.

It is evident that various modifications may be made to the apparatus disclosed herein without departing from the spirit and scope of the invention. For example, instead of using flow bias as shown in the preferred embodiment the laser could be sealed and a bias generated by use of the Langmuir flow between the anodes and the cathodes.

I claim:

1. Apparatus to frequency stabilize a molecular gas ring laser in which two different frequency beams of light are generated in opposite directions about a closed-loop path comprising in combination:

means to bias the ring laser so that two transition frequency beams may be generated at the same time in counter-rotating directions;

means measuring the intensities of the two counter-rotating beams;

means connected to the measuring means for producing a signal indicative of the difference in intensity between the two counter-rotating beams; and means to tune the cavity of the laser in accordance with the signal indicative of the difference in intensity so as to maintain the intensities of the two beams equal and thereby maintain the two different frequency beams at constant values.

2. The apparatus of claim 1 in which said biasing means comprises apparatus to cause an asymmetric flow of gas through said ring laser.

3. The apparatus of claim 2 in which said measuring means comprises detecting means operable to receive both beams and a chopper operable to alternately pass first one beam and then the other to the detecting means.

4. The apparatus of claim 3 in which said means to tune the cavity comprises apparatus to adjust the length of the ring laser cavity path.

References Cited

UNITED STATES PATENTS 3,411,849  11/1968  Aronowitz.

JEWELL H. PEDERSON, Primary Examiner

E. BAUER, Assistant Examiner

U.S. Cl. X.R.

356—106